United States Patent
Mäkelä et al.

(10) Patent No.: US 7,151,460 B2
(45) Date of Patent: Dec. 19, 2006

(54) ELECTRONIC DEVICE HAVING A PROXIMITY DETECTOR

(75) Inventors: Jakke Mäkelä, Turku (FI); Terho Kaikuranta, Piispanristi (FI)

(73) Assignee: Nokia Corporation, Espoo (FI)

( * ) Notice: Subject to any disclaimer, the term of this patent is extended or adjusted under 35 U.S.C. 154(b) by 201 days.

(21) Appl. No.: 11/033,050

(22) Filed: Jan. 10, 2005

(65) Prior Publication Data

US 2006/0164241 A1 Jul. 27, 2006

(51) Int. Cl.
*G08B 17/10* (2006.01)
(52) U.S. Cl. .............. 340/628; 340/630; 340/539.11; 340/556; 340/583; 340/686.6
(58) Field of Classification Search ............ 340/628, 340/630, 521, 539.11, 539.23, 555, 556, 577, 340/583, 586, 686.6
See application file for complete search history.

(56) References Cited

U.S. PATENT DOCUMENTS

| | | | |
|---|---|---|---|
| 4,397,557 A | | 8/1983 | Herwig et al. ............. 356/342 |
| 4,642,471 A | * | 2/1987 | Guttinger et al. ........... 250/574 |
| 4,949,077 A | * | 8/1990 | Mbuthia ..................... 340/628 |
| 5,451,931 A | * | 9/1995 | Muller et al. ............... 340/630 |
| 5,497,144 A | * | 3/1996 | Schappi et al. ............. 340/630 |
| 5,767,776 A | * | 6/1998 | Wong ......................... 340/632 |

* cited by examiner

*Primary Examiner*—Hung Nguyen
(74) *Attorney, Agent, or Firm*—Ware, Fressola, Van Der Sluys & Adolphson LLP

(57) ABSTRACT

A smoke detection device for use in a portable device such as a mobile terminal. The smoke detection device comprises a light emitter and a light detector disposed on different locations on the portable device so that when smoke or an intruding object is presence in the light path of the light emitter outside the device housing, it causes the light emitted by the light emitter to be scattered or reflected. When the light detector senses the scattered or reflected light, it can cause an alarm signal to be produced by the portable device. The emitted light can be in the infrared region so that the detection is independent of the ambient light. Alternatively, the light emitter is operated in a pulsed mode. Additional light emitter and light detectors can be disposed on the portable device for proximity sensing in addition to smoke detection.

12 Claims, 7 Drawing Sheets

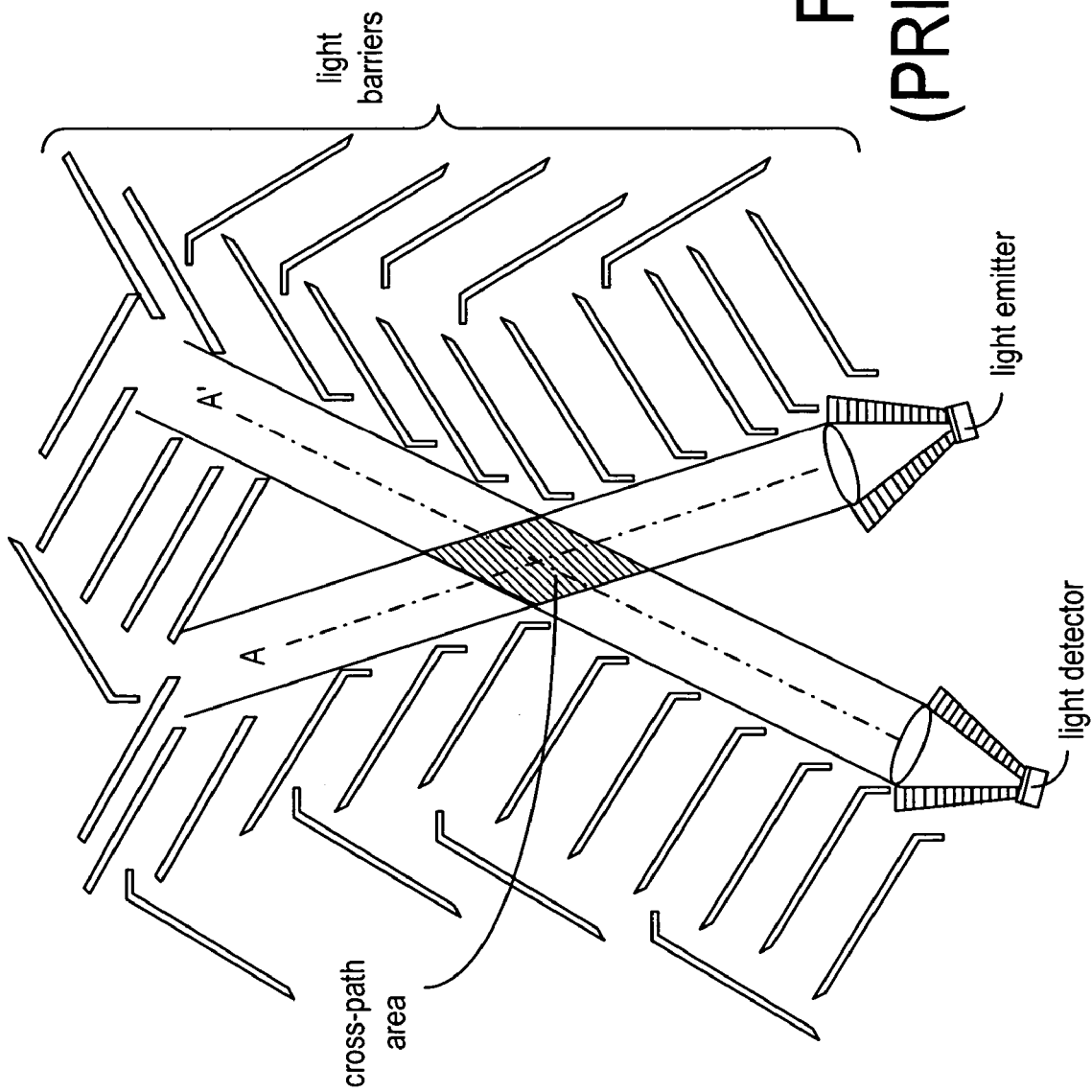
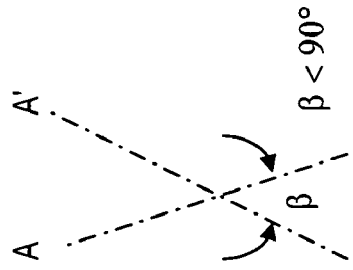
Fig. 1a (PRIOR ART)
Fig. 1b

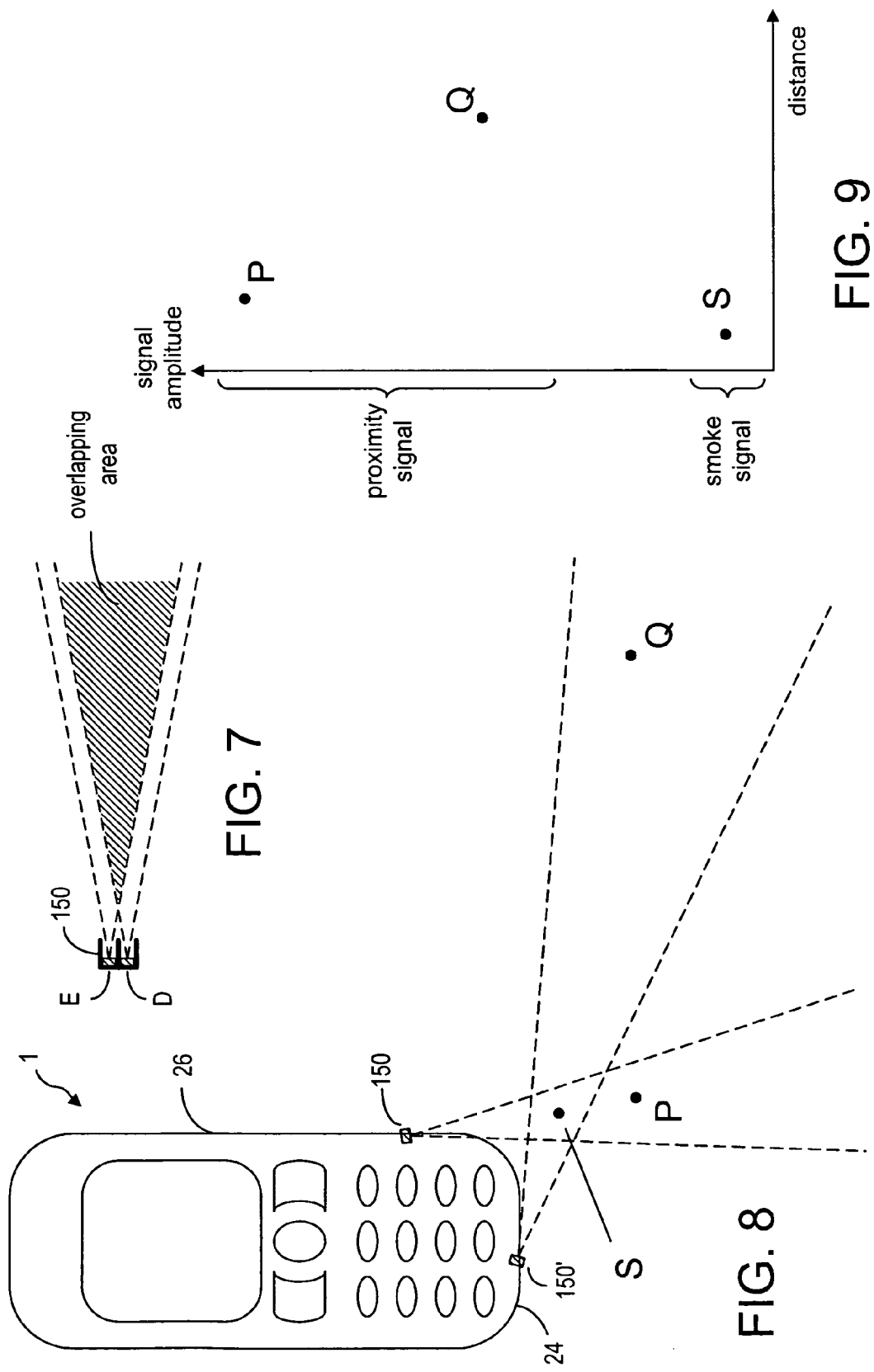

ELECTRONIC DEVICE HAVING A PROXIMITY DETECTOR

FIELD OF THE INVENTION

The present invention relates generally to a smoke detector or a proximity detector and, more particularly, to an electronic device having such a detector.

BACKGROUND OF THE INVENTION

Prior art fire and smoke detectors can generally be grouped into three types: ionization gauges, heat detectors and optical smoke detectors. An ionization gauge has an ionization chamber, wherein a small quantity of americium-241 is used to provide a source of alpha particles. Alpha particles constantly released by the americium knock electrons off of atoms in the air, thereby ionizing the oxygen and nitrogen atoms in the chamber. These ionized atoms and electrons generate a small, continuous electric current via two electrode plates. When smoke enters the ionization chamber, the smoke particles attach to the ions and neutralize them, so some of them do not reach the plates. Consequently, the drop in the electric current triggers the alarm. The ionization gauge is not suitable for use in a small electronic device, such as a mobile phone, because the gauge requires a sufficiently large ionization chamber to produce a useful electric current. Furthermore, although alpha particles do not normally post radiation risks, a mobile phone user may find it uncomfortable to expose the head and ear to a radioactive source at close range. Also, delivering, storing and handling a large quantity of radioactive raw material for manufacturing may not be a viable option for a cell phone manufacturer.

Heat detectors only measure unusually large and sudden increases in room temperature. By the time a heat detector detects such an increase to make a warning, it would generally be too late to protect life and property in the room, because the room may be already filled with heavy smoke and flames. Furthermore, a telephone set may generate sufficient amount of heat during a call or during a video clip viewing session. The heat so generated may be indistinguishable from the heat generated by a fire.

Prior art optical smoke detectors usually rely on two main configurations: forward light scattering and backward light scattering in a dark chamber. Herwig et al. (U.S. Pat. No. 4,397,557) discloses a smoke detector wherein a light emitter and a light detector are arranged in a dark chamber having a plurality of light barriers or diaphragms such that the light detector normally does not see a significant amount of light in the dark chamber. The light beam from the light emitter is confined to a light transmission path or volume. Likewise, the light detector is able to detect light within a light reception path or volume. The light transmission path and the light reception path intersect at a location referred herein as a cross-path area, as shown in FIG. 1a. When smoke particles drift into the cross-path area, they scatter the light emitted from the light emitter and part of the scattered light is detected by the light detector. The relative orientation of the light emitter and the light detector is such that the scattering angle, $\beta$, is smaller than 90°, as shown in FIG. 1b. Thus, the smoke detection scheme, according to Herwig et al., is based on the backscattering of light by smoke particles in a dark chamber.

Smoke detection can also be based on forward scattering of light by smoke particles in the dark chamber. As shown in FIG. 2a, a dark chamber having labyrinths (not shown) is used to prevent ambient light from being detected by the light detector. Thus, only air, but not ambient light, can enter the dark chamber. At the same time, a light stop is used to prevent the light detector from seeing the light beam from the light emitter directly. However, when smoke particles drift into the cross-path area in the dark chamber, the scattered light by the smoke particles can be detected by the light detector. As shown in FIG. 2b, the scattering angle is greater than 90°.

The prior art smoke detectors based on backward or forward scattering of light require a dark chamber to shield ambient light from entering the smoke-detection area. Such a smoke detector cannot be practically implemented on a small portable device, such as a mobile phone, because it requires a dark chamber.

It is thus advantageous and desirable to provide a method and device for smoke detection using opto-electronic components that can be disposed on a mobile phone without a dark chamber.

SUMMARY OF THE INVENTION

It is a primary object of the present invention to dispose a smoke detection device for use in a portable device such as a mobile terminal. The smoke detection device comprises a light emitter and a light detector disposed different locations on the portable device so that when smoke or an intruding object is presence in the light path of the light emitter outside the device housing, it causes the light emitted by the light emitter to be scattered or reflected. When the light detector senses the scattered or reflected light, it can cause an alarm signal to be produced by the portable device. The emitted light can be in the infrared region so that the detection is independent of the ambient light. Alternatively, the light emitter is operated in a pulsed mode. Additional light emitter and light detectors can be disposed on the portable device for proximity sensing in addition to smoke detection.

Thus, the present invention provides a portable electronic device having a housing to house a plurality of electronic components, the electronic components including a signal processor and an alerting device operatively connected to the signal processor. The portable device comprises:

a first opto-electronic component disposed on the housing; and a second opto-electronic component disposed on the housing in relationship to the first opto-electronic component, wherein the first opto-electronic component comprises a light emitter for emitting light in a light emitting path substantially outside the housing, and the second opto-electronic component comprises a light detector for detecting light coming from a part of the light emitting path, the light detector operatively connected to the signal processor, so that when an object is present in a light emitting path, causing part of the light emitted by the light emitter to be sensed by the light detector, a detection signal is provided to the signal processor for producing an alerting signal on the alerting device.

According to the present invention, the emitted light comprises light substantially in the infrared region, but it is also possible that the light emitter emits light in a pulsed mode.

According to the present invention, the first opto-electronic device is disposed at a first location on the housing and the second opto-electronic device is disposed at a second location on the housing different from the first location, and the light detector has a light detection path intersecting with the light emitting path in an intersecting area such that the object causes scattering of the emitted light in the intersecting area and the sensing by the light detector is at least based on the scattered light.

According to the present invention, the light emitting path is disposed along an emitting path direction, and the first opto-electronic device further comprises a further light detector having a further light detecting path substantially along with the emitting path direction so as to sense the presence of the object in the light emitting path.

According to the present invention, the second opto-electronic device further comprises a further light emitter having a further light emitting path along a further emitting path direction, and the light detector in the second opto-electronic device is disposed substantially along the further emitting path direction so as to sense the presence of the object in the further light emitting path.

According to the present invention, the portable device comprises a switch for selecting among a plurality of detection modes: a first mode for sensing by the light detector only, a second mode for sensing by both the light detector and the further light detector, and a third mode disabling both the light detector and the further light detector.

According to the present invention, when the switch selects the second mode, the sensing by the light detector and the sensing by the further light detector are carried out in an alternate fashion.

According to the present invention, some of the components are operable in a first operating mode and a power-saving second operating mode, and the sensing of the presence of the object is carried out when said some of the components are operable in the second operating mode, and the detection signal causes some of the components to operate in the first operating mode.

According to the present invention, the portable device is a mobile terminal, and the alerting signal is an audible signal.

The present invention will become apparent upon reading the description taken in conjunction with FIGS. 3a to 10.

BRIEF DESCRIPTION OF THE DRAWINGS

FIG. 1a shows a prior art optical smoke detector using a dark chamber to shield ambient light from reaching the light detector therein.

FIG. 1b illustrates the geometry of backscattering of light.

FIG. 5b is a side-view showing the scattering geometry of the embodiment shown in FIG. 5a.

FIG. 7 is a schematic representation showing an opto-electronic component having a light emitter and a light detector.

FIG. 8 is a schematic representation showing a plurality of opto-electonic components disposed on a mobile phone for use as a proximity detector and a smoke detector, according to the present invention.

FIG. 9 is a plot showing the relative signal amplitude in proximity detection and smoke detection.

DETAILED DESCRIPTION OF THE INVENTION

Figure 2B:
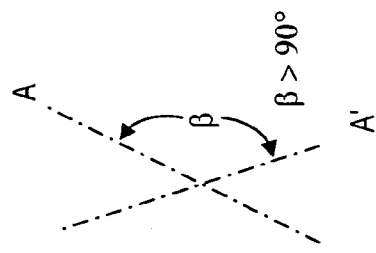
FIG. 2b illustrates the geometry of forward-scattering of light.
Figure 2A:
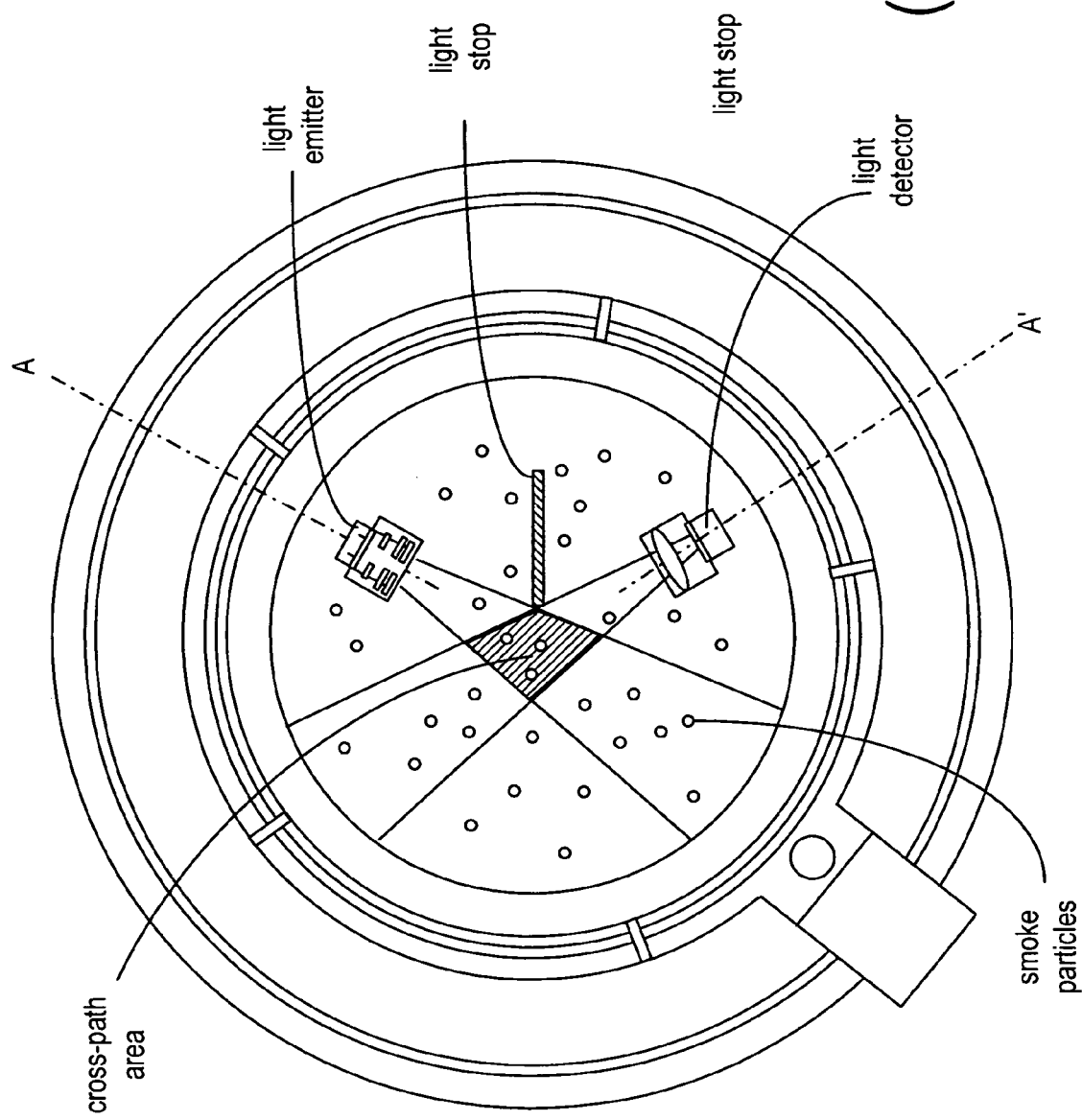
FIG. 2a shows another prior art optical smoke detector having a dark chamber.

According to the present invention, the opto-electronic components disposed on a portable device, such as a mobile phone, for smoke detection do not require a dark chamber to be functional. As shown in FIGS. 3a to 6b, the opto-electronic components are disposed on the external housing of the mobile phone. As shown in FIG. 3a to 6b, the mobile phone 1 has an external housing 10 to house a variety of electronic components (see FIG. 10). As shown, the mobile phone 1 has a display 32 disposed on the front surface 30 of the mobile phone. The housing 10 has four side surfaces: upper surface 22, lower surface 24, right surface 26 and left surface 28.

Figure 3A:
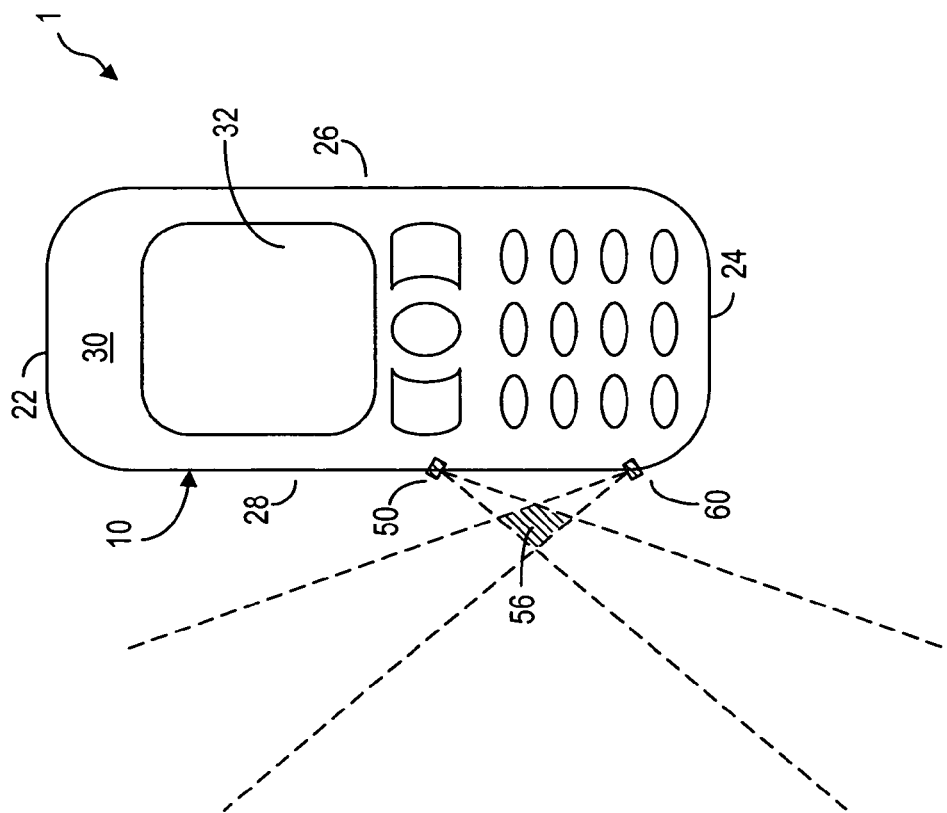
FIG. 3a is a schematic representation showing a plurality of opto-electronic components disposed on a mobile phone for smoke detection based on forward scattering of light, according to the present invention.
Figure 3B:
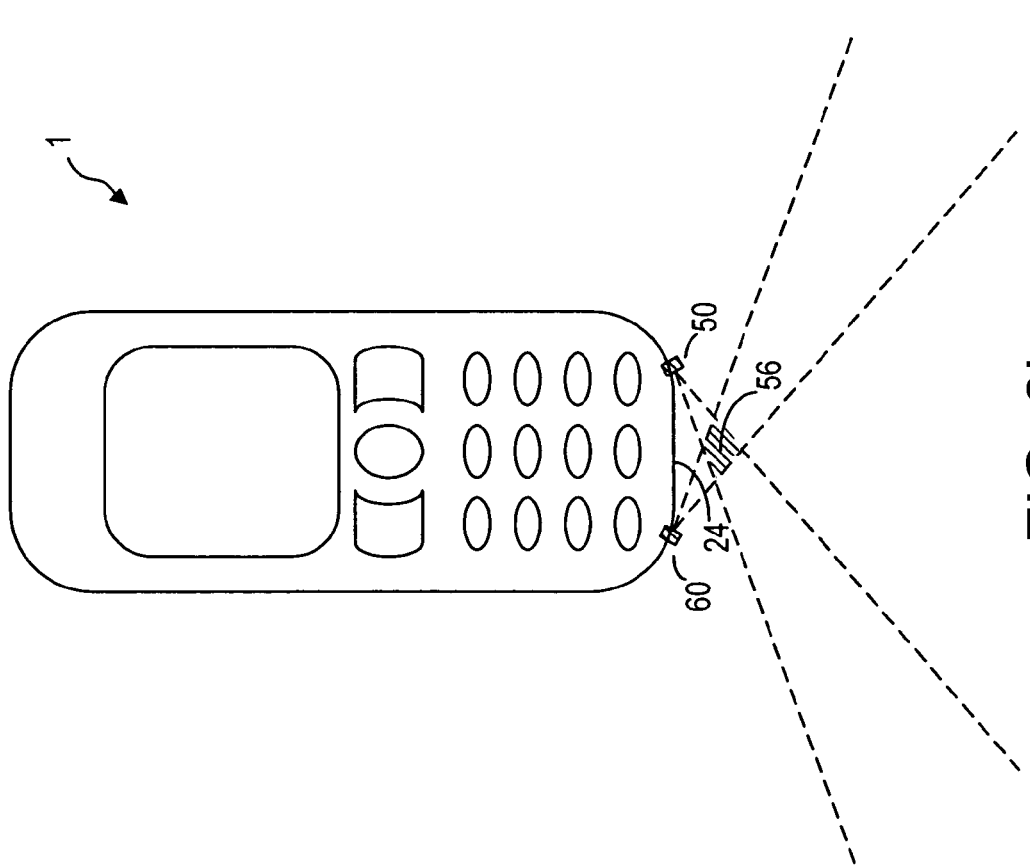
FIG. 3b is a schematic representation showing a plurality of opto-electronic components disposed on a mobile phone for smoke detection based on forward scattering of light, according to another embodiment of the present invention.

The opto-electronic components 50 and 60 used for smoke detection can be disposed on one or two side surfaces, as shown in FIGS. 3a–4b. In one embodiment of the present invention, the opto-electronic components 50 and 60 are both disposed near or on the lower surface 24 of the mobile phone 1, as shown in FIG. 3a. In another embodiment of the present invention, the opto-electronic components 50 and 60 are both disposed near or on the left surface 28 of the mobile phone 1, as shown in FIG. 3b. One of the opto-electronic components is a light emitter and the other is a light detector. For smoke detection purposes, the detection area is the cross-path area 56. For illustrating purposes, let components 50 and 60 be the light emitter and the light detector, respectively. Because of the relative orientation of the light emitter 50 and the light detector 60, the scattering geometry is similar to that shown in FIG. 2b. Thus, the scattered light from the cross-path area 56 as seen by the light detector 60 is mostly the result of forward scattering.

Figure 4B:
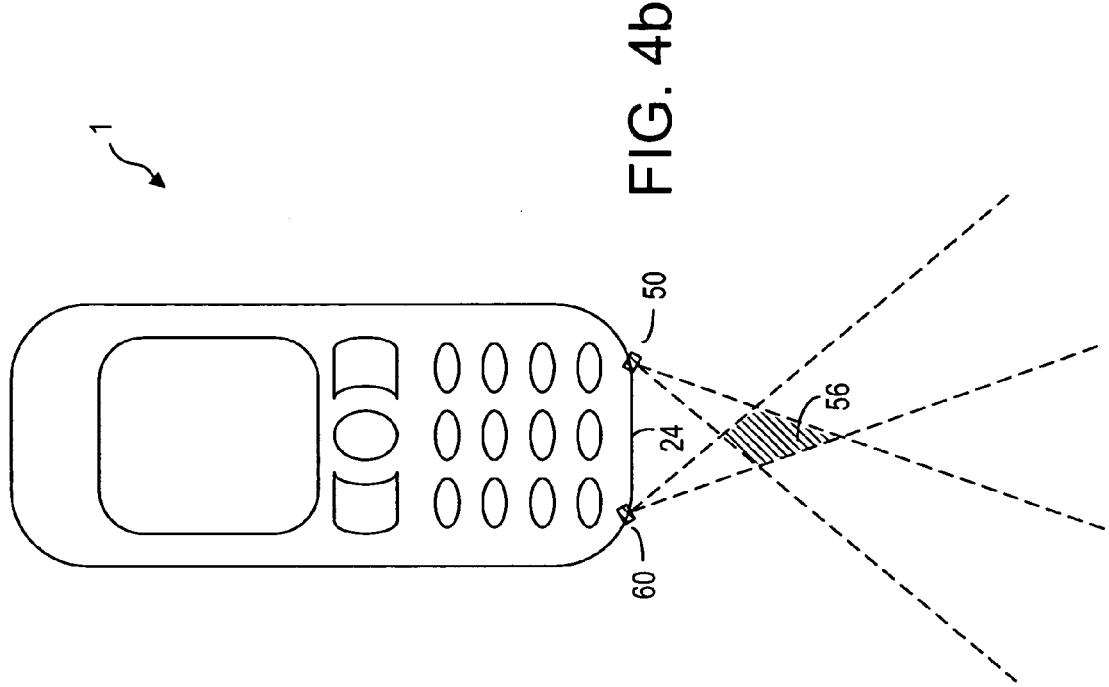
FIG. 4b is a schematic representation showing a plurality of opto-electronic components disposed on a mobile phone for smoke detection based on forward scattering of light, according to another embodiment of the present invention.
Figure 4A:
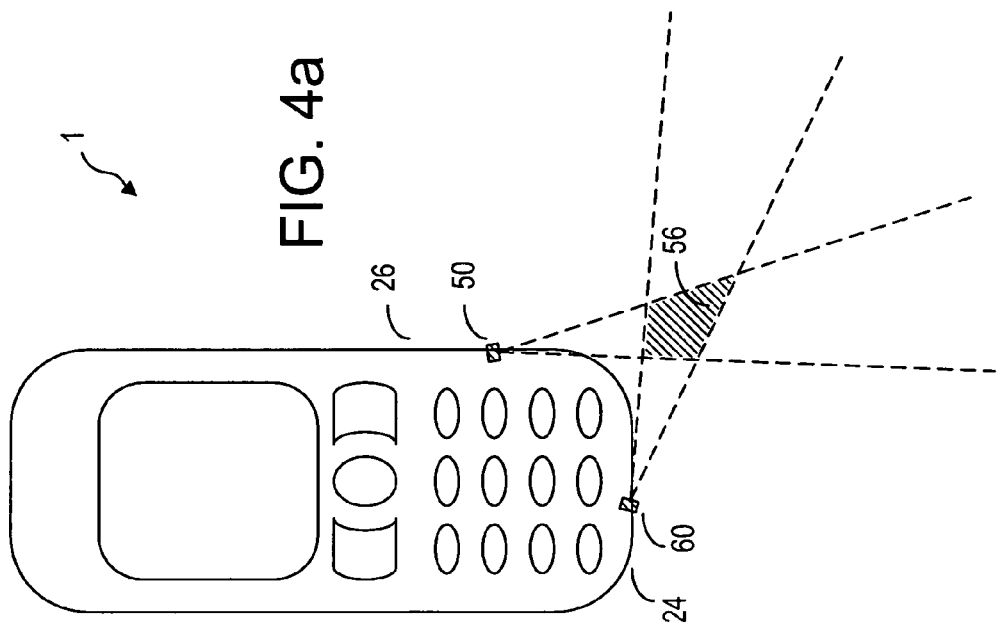
FIG. 4a is a schematic representation showing a plurality of opto-electronic components disposed on a mobile phone for smoke detection based on backward scattering of light, according to the present invention.

In a different embodiment of the present invention, the opto-electronic components 50, 60 are disposed on different surfaces of the housing 10. For example, the light emitter 50 is located near or on the right surface 26 and the light detector is located near or on the lower surface 24, as shown in FIG. 4a. Because of the relative orientation of the light emitter 50 and the light detector 60, the scattering geometry is similar to that shown in FIG. 1b. Thus, the scattered light from the cross-path area 56 as seen by the light detector 60 is mostly the result of backscattering.

In still another embodiment of the present invention, the opto-electronic components 50, 60 are disposed near or on the same side surface, but light detection is based on backscattering. As shown in FIG. 4b, the light emitter 50 and the light detector 60 are both disposed near or on the lower surface 24, but the scattering angle in the cross-path area 56 is smaller than 90°.

Figure 5A:
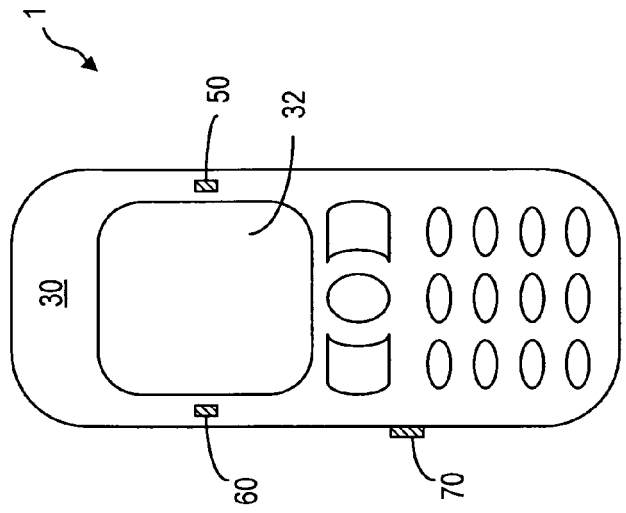
FIG. 5a is a front-view showing a mobile phone having a plurality of opto-electronic components disposed on the front surface for smoke detection, according to yet another embodiment of the present invention.
Figure 6A:
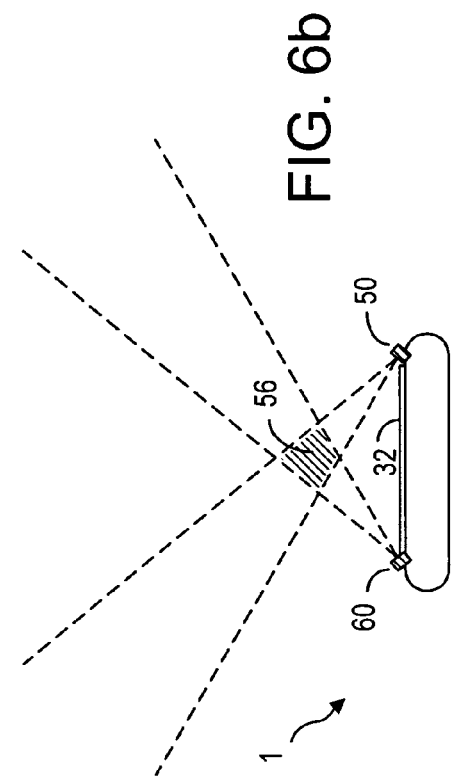
FIG. 6a is a front-view showing a mobile phone having a plurality of opto-electronic components disposed on the front-surface for smoke detection, according to another embodiment of the present invention.
Figure 5B:
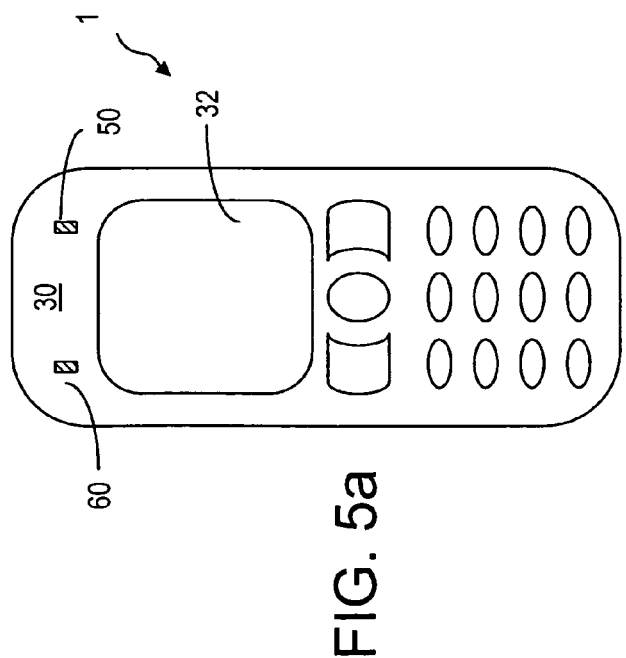
Figure 6B:
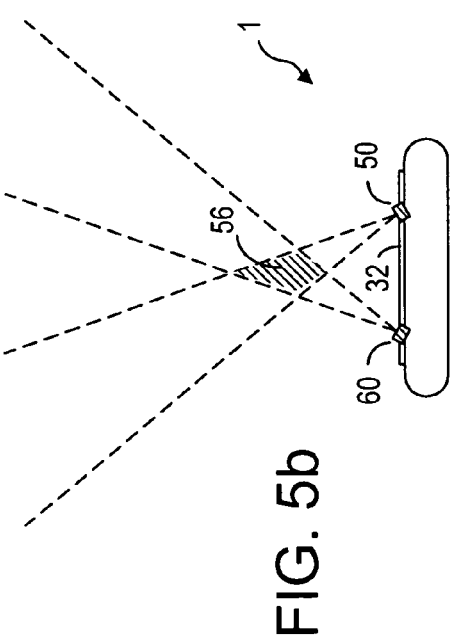
FIG. 6b is a side-view showing the scattering geometry of the embodiment shown in FIG. 6b.

In another different embodiment of the present invention, the light emitter 50 and the light detector 60 are both disposed on the front surface 30 of the mobile phone, as shown in FIGS. 5a–6b. As shown in FIG. 5a, the light emitter 50 and the light detector 60 are located above the display 32 of the mobile phone. The scattering geometry, as shown in FIG. 5b, indicates that the smoke detection is based on backscattering. Alternatively, the light emitter 50 and the light detector 60 are located on different sides of the display 32, as shown in FIGS. 6a and 6b. In the embodiments as shown in FIGS. 3a–6b, when smoke particles drift into the cross-path area 56 near the mobile phone, a warning signal, such as an audible alarm signal can be provided to alert the user.

It should be noted that, in some of the mobile phones, the display 32 is also used as a touch pad for information entry. In such a mobile phone, a plurality of opto-electronic components are disposed around the periphery of the display to detect the presence of a touch object and to determine its position. These opto-electronic components can be also used for smoke detection. Touch pad entry based on light reflected from a touch object has been disclosed in pending applications, entitled METHOD AND DEVICE FOR DETECTING TOUCHPAD INPUT (U.S. patent application Ser. No. 09/928,967, filed Aug. 13, 2001) and METHOD FOR PREVENTING UNINENDED TOUCHPAD INPUT DUE TO ACCIDENTAL TOUCHING (U.S. patent application Ser. No. 09/928,929, filed Aug. 13, 2001). In particular, the emitters are operated in a pulsed mode so as to separate the detection signal from ambient light signal. For example, the ambient light signal can be filtered out as a DC component in the detected signal. These pending applications are herein incorporated in their entirety by reference.

It should be noted that the smoke detection function of a mobile phone, in general, is used only in selected circumstances. For example, a user may use it only at night when the mobile phone is not used for outgoing calls. Thus, at other times, the smoke detection function should be disabled. Thus, a switch 70, as shown in FIG. 6a, is provided on the mobile phone to turn the smoke detection function on or off. When the smoke detection function is turned off, the warning signal is also disabled. Thus, when the phone is used for its regular functions, no alarm signal is produced.

Furthermore, in order that the smoke detection function is ambient light independent, the light emitter can be operated in a pulsed mode with a certain pulse frequency or frequency pattern. As such, ambient light detected by the light detector can be ignored. Moreover, the light emitter and the light detector can be operated in a spectral range substantially outside the visible spectrum. For example, the light emitter 50 can be an infrared LED, laser or VCSEL (vertical cavity surface emitting laser diode). The light detector 60 can have a color filter to admit only light in the desirable spectral range.

The smoke detection method of the present invention as described in conjunction with FIG. 3a to 6b is based on the scattering of light. In general, the detectable signal from scattered light is weak. Thus, the cross-path area 56 should be located close to the light emitter 50 and the light detector 60. However, the same method can be extended to the detection of a large object present at a longer range.

It is possible to use, in lieu of the light emitter 50, an opto-electronic component 150 having a light emitter E and a light detector D, as shown in FIG. 7. In the opto-electronic device 150, the light detector D is prevented from seeing the light emitted by the light emitter E directly. As shown in FIG. 7, the light transmission path of the emitter E and the light reception path of the detector D have an overlapping area in the forward direction. When an object is present in the overlapping area, that object may reflect light emitted by the emitter E to the detector D. Because reflected light from a large object generally produces a much stronger detectable signal than scattered light from smoke particles, the opto-electronic device 150 can be used as a proximity detector to detect the presence of an unexpected object at a much longer range. Thus, if the light emitter 50 and the detector 60 are replaced by two opto-electronic components 150, the optical arrangement in any of the embodiments as shown in FIGS. 3a–6b can be used as a proximity detector as well as a smoke detector.

For example, if two opto-electronic components 150, 150' are disposed on the mobile phone 1 as shown in FIG. 8, the mobile phone can be used to detect smoke particles, S, drifting into the cross-path area at a close range. When a large object, such as a person, is present at P outside the cross-path area, the detector D in the opto-electronic component 150 can detect the light reflected by the object at P. Likewise, an object present at Q can be detected by the detector in the opto-electronic component 150'. With opto-electronic components 150, 150' disposed on a mobile phone, a user can use the mobile phone as a smoke detector and a proximity detector. For example, such a mobile phone can be also used to watch a hotel door while the user is asleep in the hotel room.

As mentioned earlier, the detection signal resulting from light reflected by an object is generally much stronger than the signal from light scattered by smoke particles. As shown in FIG. 9, the proximity signal from the reflection by an object at P is much stronger than the smoke detection signal by smoker particles S, even though point P is farther from the mobile phone. As the detection distance increases, the emitted light intensity decreases, the proximity signal resulting from the reflection by a large object is also reduced. Thus, the proximity signal from P is much stronger than the proximity signal from Q. Nevertheless, the detection signal from Q is still stronger than the detection signal from smoke particles S. Thus, it is possible to operate the smoke detection arrangement on the mobile phone as a long-range proximity sensor. In the hotel door watch application, for example, a proximity range of 10 meters, for example, is normally sufficient.

It should be noted that smoke detection function should only be used when the mobile phone is placed in a more-or-less open area, and no obstacles should be present near the cross-path area. It is possible to use the proximity detection feature to make sure that no obstacles are present at a close range that might prevent smoke particles from drifting into the cross-path area.

When the proximity detection function is used to watch a hotel door, for example, the mobile phone must be aimed at the door. The reflected light from the door and its surroundings may give rise to a significantly large signal in the proximity detector. This unwanted signal may be stronger than a potential smoke signal. Thus, this background signal must be adequately suppressed. This can be carried out by an electronic circuit or by a software algorithm operatively connected to the signal processor in the mobile phone. Furthermore, it is possible to use the switch 70 to select one of the following detection modes:

1. smoke and proximity detection;
2. smoke detection only; and
3. "off" mode.

When the switch 70 is used to select the smoke detection only mode, it disables the emitter E in the opto-electronic component 150' and the detector D in the opto-electronic component 150. As such, the detection mode in the mobile phone as shown in FIG. 8 is similar to that in the mobile phone as shown in FIG. 4a. When the switch 70 is switched to "off", all light detectors are effectively disabled. When the switch 70 is switched to the "smoke and proximity detection" mode, it is preferable that the smoke detection and the proximity detection are carried out in an alternate fashion. For example, the proximity detection mode can be alternately turned on for one second and turned off for one second. The proximity detection mode can be turned off by disabling the emitter E in the opto-electronic component 150' and the detector D in the opto-electronic component 150, for example. Because the proximity signal is usually much stronger than the smoke signal, as shown in FIG. 9, it is possible to use a higher gain factor when the smoke detection mode is on.

Figure 10:
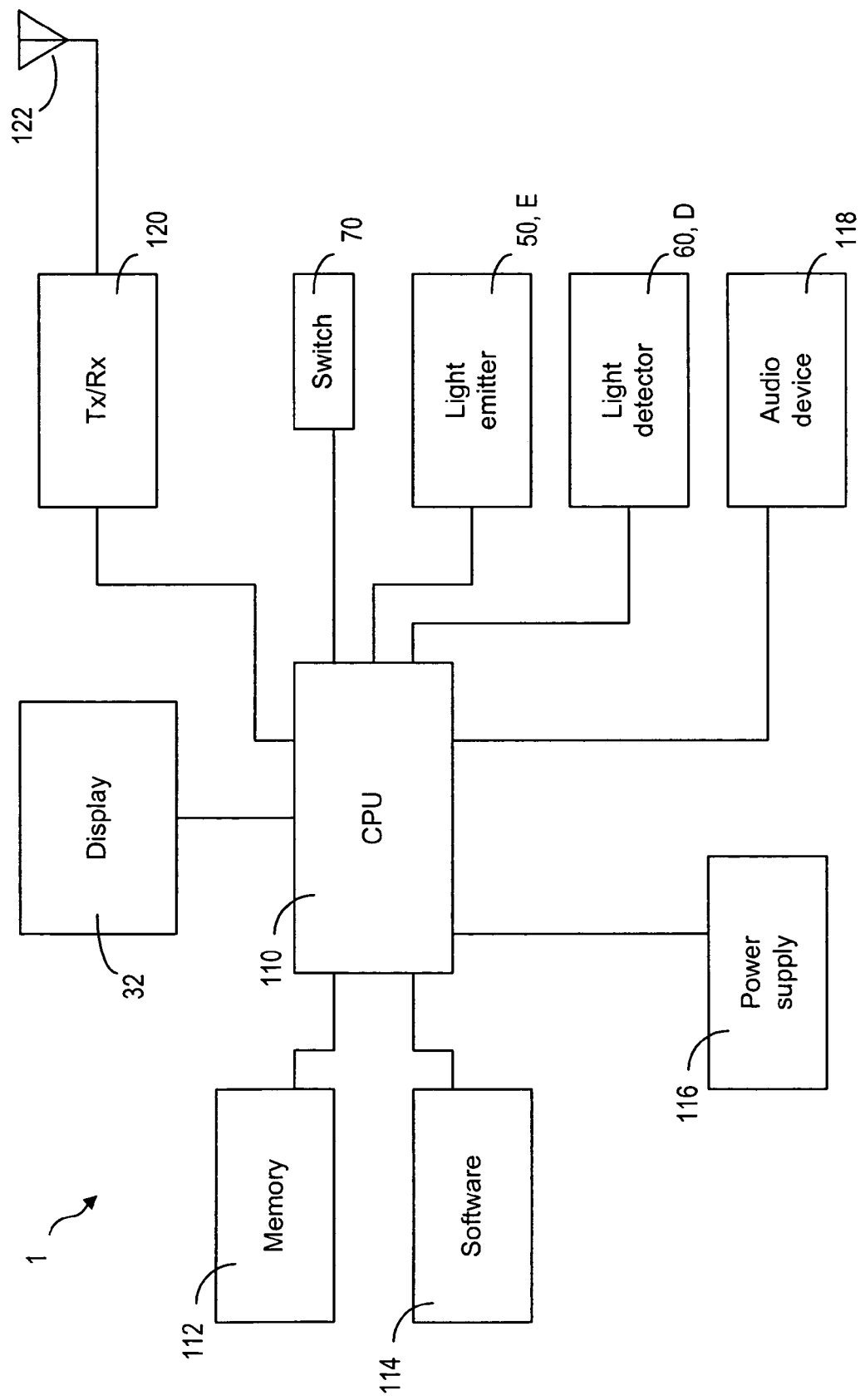
FIG. 10 is a block diagram showing various electronic components in a mobile phone having an opto-electronic detector for smoke and proximity detection.

In a typical mobile phone, as shown in FIG. 10, there are various electronic components enclosed in or disposed on the housing. For example, the components may include a CPU 110 for signal and data processing, a memory unit 112 for storing data, a software program 114 for carrying out a variety of functions including the smoke/proximity detection function, a power supply 116, an audio device 118 including a microphone and a speaker, for example, an RF front-end 120 operatively connected to an antenna 122. The light emitter (50, E) and the light detector (60, D) are operatively connected to the CPU 110 so that the light emitter is caused to emit light in a pulsed mode, for example, and only when the detection function has been activated by the switch 70. The detection signal from the light detector is processed by the CPU. When smoke or an intrusion is detected, the CPU causes the audio device to sound an alarm, for example.

In sum, the present invention uses a pair of opto-electronic components disposed on an electronic device, such as a mobile phone, to detect light scattered from smoke particles in a close range and to detect light reflected from an unexpected object at a longer range. A switch is provided on the electronic device so that the smoke and proximity detection function can be turned on or off.

The electronic device, according to the present invention, can operate in a sleeping mode (or a power saving mode) when it is used for smoke and proximity detection. Like a mobile phone where the phone can wake itself up from a sleeping mode in the event of an incoming call, the electronic device, according to the present invention, can wake itself up in the event of the smoke or proximity detection. In the sleeping mode, some of the components in the electronic device, such as the display 32, the software module 114 and the CPU 110, can be operated in a power saving mode. For example, when the display 32 is operated in the power saving mode, its illuminating source is turned off. The power saving mode for a mobile terminal is known in the art.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A portable electronic device having a housing to house a plurality of electronic components, the electronic components including a signal processor and an alerting device operatively connected to the signal processor, said portable device comprising:

a first opto-electronic component disposed on the housing; and a second opto-electronic component disposed on the housing in relationship to the first opto-electronic component, wherein the first opto-electronic component comprises a light emitter for emitting light in a light emitting path substantially outside the housing, and the second opto-electronic component comprises a light detector for detecting light coming from a part of the light emitting path, the light detector operatively connected to the signal processor, so that when an object is present in a light emitting path, causing part of the light emitted by the light emitter to be sensed by the light detector, a detection signal is provided to the signal processor for producing an alerting signal on the alerting device.

2. The portable device of claim 1, wherein the emitted light comprises light substantially in the infrared region.

3. The portable device of claim 1, wherein the light emitter emits light in a pulsed mode.

4. The portable device of claim 1, wherein the first opto-electronic device is disposed at a first location on the housing and the second opto-electronic device is disposed at a second location on the housing different from the first location, and wherein the light detector has a light detection path intersecting with the light emitting path in an intersecting area such that the object causes scattering of the emitted light in the intersecting area and the sensing by the light detector is at least based on the scattered light.

5. The portable device of claim 4, wherein the light emitting path is disposed along an emitting path direction, and wherein the first opto-electronic device further comprises a further light detector having a further light detecting path substantially along with the emitting path direction so as to sense the presence of the object in the light emitting path.

6. The portable device of claim 4, wherein the second opto-electronic device further comprises a further light emitter having a further light emitting path along a further emitting path direction, and the light detector in the second opto-electronic device is disposed substantially along the further emitting path direction so as to sense the presence of the object in the further light emitting path.

7. The portable device of claim 5, further comprising a switch for selecting between the sensing by the light detector and the sensing by the further light detector.

8. The portable device of claim 5, further comprising a switch for selecting among a plurality of detection modes: a first mode for sensing by the light detector only, a second mode for sensing by both the light detector and the further light detector, and a third mode disabling both the light detector and the further light detector.

9. The portable device of claim 8, wherein when the switch selects the second mode, the sensing by the light detector and the sensing by the further light detector are carried out in an alternate fashion.

10. The portable device of claim 1, wherein some of the components are operable in a first operating mode and a power-saving second operating mode, and wherein the sensing of the presence of the object is carried out when said some of the components are operable in the second operating mode, and the detection signal causes some of the components to operate in the first operating mode.

11. The portable device of claim 1, comprising a mobile terminal.

12. The portable device of claim 1, wherein the alerting device comprises an audio device and the alerting signal comprises an audible signal.

* * * * *